United States Patent
Böhm

(10) Patent No.: US 9,962,784 B2
(45) Date of Patent: May 8, 2018

(54) THREAD FORMING TOOL

(71) Applicant: BASS GMBH & CO. KG TECHNIK FÜR GEWINDE, Niederstetten (DE)

(72) Inventor: Werner Böhm, Blaufelden (DE)

(73) Assignee: BASS GmbH & Co. KG Technick für Gewinde, Niederstetten (DE)

( * ) Notice: Subject to any disclaimer, the term of this patent is extended or adjusted under 35 U.S.C. 154(b) by 352 days.

(21) Appl. No.: 14/763,057

(22) PCT Filed: Jan. 8, 2014

(86) PCT No.: PCT/EP2014/050240
§ 371 (c)(1),
(2) Date: Nov. 9, 2015

(87) PCT Pub. No.: WO2014/114492
PCT Pub. Date: Jul. 31, 2014

(65) Prior Publication Data
US 2016/0059336 A1    Mar. 3, 2016

(30) Foreign Application Priority Data

Jan. 24, 2013  (DE) .................. 10 2013 001 195
Feb. 26, 2013  (DE) .................. 10 2013 003 291

(51) Int. Cl.
*B23G 7/02*   (2006.01)
*B23G 5/06*   (2006.01)
*B23G 5/00*   (2006.01)

(52) U.S. Cl.
CPC .............. *B23G 7/02* (2013.01); *B23G 5/005* (2013.01); *B23G 5/06* (2013.01); *B23G 2240/12* (2013.01); *Y10T 407/14* (2015.01)

(58) Field of Classification Search
CPC . B23G 1/16; B23G 5/005; B23G 5/06; B23G 5/062; B23G 7/00; B23G 7/02;
(Continued)

(56) References Cited

U.S. PATENT DOCUMENTS 2,121,380 A     6/1938   Bath
5,080,538 A *   1/1992   Schmitt .................. B23G 5/184
                                                        409/66

(Continued)

FOREIGN PATENT DOCUMENTS

DE    103 18 199        11/2004
DE    102 38 775 B4     10/2007
(Continued)

OTHER PUBLICATIONS

International Search Report and Written Opinion for International Application No. PCT/EP2014/050240, dated: Mar. 7, 2014 date of filing: Jan. 8, 2014, 11 pages (no English translation available).

*Primary Examiner* — A. Dexter Tugbang
*Assistant Examiner* — Joshua D Anderson
(74) *Attorney, Agent, or Firm* — Christopher R. Christenson; Kelly, Holt & Christenson, PLLC

(57) ABSTRACT

The invention relates to a thread forming tool having a thread part based on a helical effective surface (1), and an adjoining clamping shank (2), wherein the helical effective surface (1) is formed by pressing lobes (5) and the thread part extends from a chamfer or taper (6) in the direction of the clamping shank (2). Furthermore, at least one axially oriented, groove-like cooling channel (7) that runs between the pressing lobes (5) and extends from the chamfer or taper (6) to the clamping shank (2) is provided. According to the invention, the width of the at least one cooling channel (7) increases from the chamfer (6) in the direction of the clamping shank (2).

10 Claims, 3 Drawing Sheets

Figure 1:
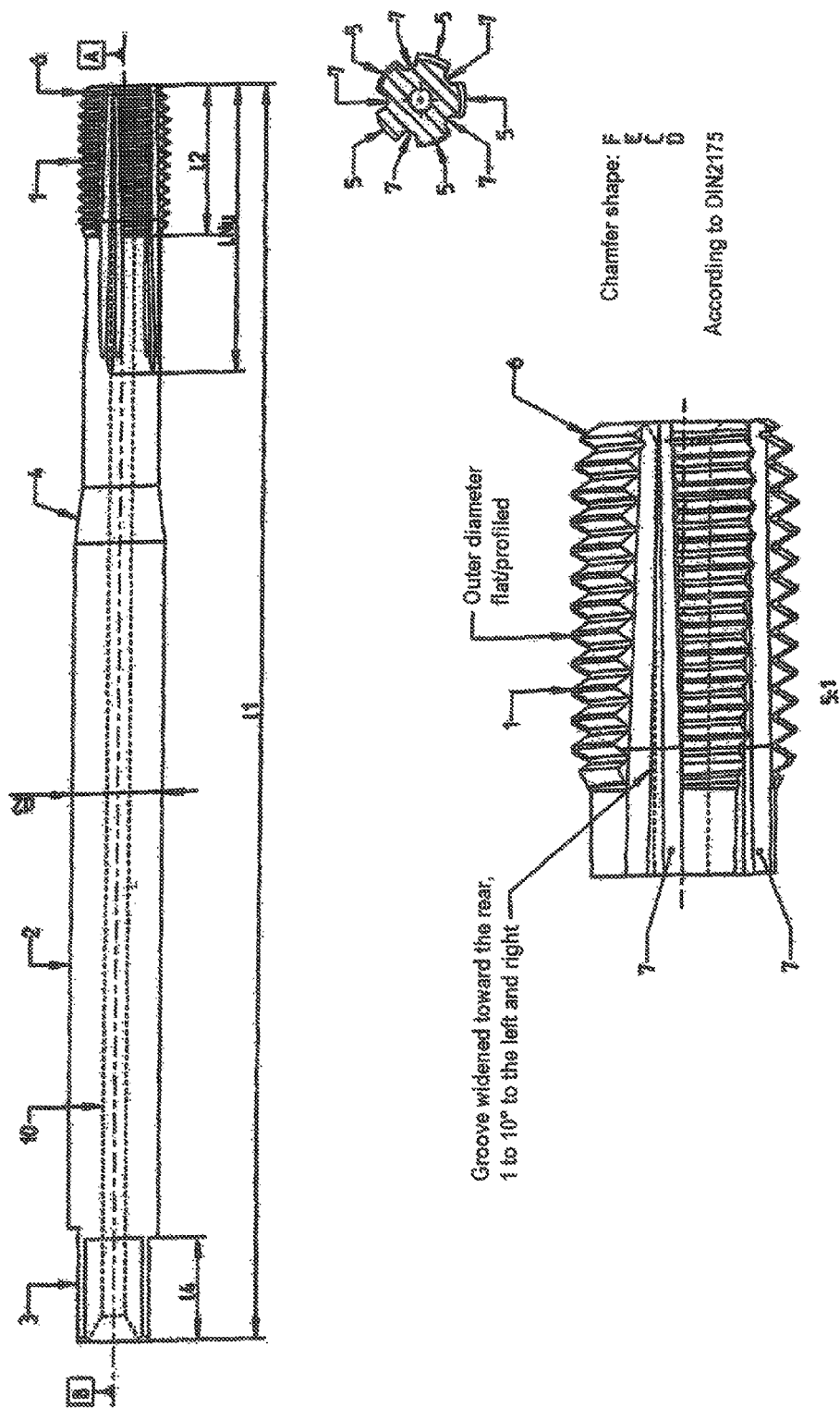

(58) Field of Classification Search
CPC ........ B23G 2200/142; B23G 2200/146; B23G 2200/16; B23G 2200/32; B23G 2200/34; B23G 2200/42; B23G 2210/04; B23G 2240/08; B23G 2240/12; Y10T 407/14; B21H 3/08
USPC .............................................. 72/41; 470/198
See application file for complete search history.

(56) References Cited

U.S. PATENT DOCUMENTS

| | | | |
|---|---|---|---|
| 5,413,438 A * | 5/1995 | Turchan | B23G 1/34 408/222 |
| 6,685,573 B2 | 2/2004 | Hikosaka et al. | |
| 7,073,988 B2 * | 7/2006 | Giessler | B23G 5/005 408/222 |
| 2011/0085867 A1 | 4/2011 | Ellis | |

FOREIGN PATENT DOCUMENTS

| | | |
|---|---|---|
| DE | 20 2013 001880 | 3/2013 |
| JP | H05 49216 | 6/1993 |

* cited by examiner

THREAD FORMING TOOL

CROSS-REFERENCE TO RELATED APPLICATION

This Application is a Section 371 National Stage Application of International Application No. PCT/EP2014/050240, filed Jan. 8, 2014 and published as WO/2014/114492 A1 on Jul. 31, 2014, the contents of which are hereby incorporated by reference in their entirety.

The invention relates to a thread forming tool having a thread part based on a helical effective surface, and an adjoining clamping shank, wherein the helical effective surface is formed by pressing lobes and the thread part extends from a chamfer or taper in the direction of the clamping shank, as well as having furthermore at least one axially oriented, groove-like cooling channel that runs between the pressing lobes and extends from the chamfer or taper to the clamping shank according to the preamble of claim 1.

From DE 102 38 775 B4 a non-cutting thread forming tap having a screw-shaped external thread is already known, the external thread comprising alternately linked margins and reliefs for forming an internal thread by plastic deformation. A helix line of the margins of the external thread of the already known thread forming tap runs in a direction opposite to a direction of a helix line of the external thread so as to reduce the rotational resistance, i.e. the thread forming torque, during thread forming. The known thread forming tap moreover comprises a lubricating groove extending on the external thread either in parallel or diagonal with an axis of the external thread, the lubricating groove extending in a straight line either on a portion of the external thread or over the entire surface of the external thread. If the aforementioned lubricating grooves have a helix angle, i.e. if they are twisted in the same direction as the axially adjoining thread margins, the oil grooves can be manufactured more easily, even if the relief side is narrow and the space for producing the oil grooves is correspondingly small.

In the thread forming tool having a clamping shank and a threaded piece of an essentially polygonal cross-sectional shape with a screw-shaped effective area according to DE 103 18 199 A1, lubricating of the tool for optimizing the thread forming conditions is realized in that axially extending lubricating grooves in each case extending centrally between existing pressing lobes are provided on the essentially convex cross-sectional sides of the threaded piece of the thread forming tool. These lubricating grooves may be supplied with lubricant from an interior central lubricant channel system within the thread forming tool branching into the lubricating grooves.

Basically, in thread forming tools as the tools the non-cutting manufacture of female threads, a cold-forming is performed without the fiber flow of the material and the crystalline structure thereof being interrupted.

Thread forming here refers to pressing a thread into a workpiece by means of a tool having a helical effective surface.

The tool's screw-shaped thread part which e.g. is provided with a polygon, is screwed in a correspondingly pre-drilled workpiece at a constant feed rate corresponding to the pitch of the thread. In doing so, the thread profile presses into the material via the chamfer or taper of the thread part. The stress in the compression zone exceeds the compression limit, and the desired plastic deformation of the material takes place. Specifically, the material gives way and flows along the thread profile in the tool's free tooth root surface so that the core diameter of the thread is formed.

In such thread forming methods, the necessary lubricating is of quite essential importance. The lubricating is intended to preclude material or other remainders from adhering to the threaded plate sides, and an unnecessary increase of torque is thereby caused.

Particular difficulties in terms of supplying and discharging lubricant are generated in the formation of female threads in blind holes, which means that the necessary amount of coolant or lubricant needs to be returned from the area of plastic deformation via the tool and past the tool while having in this case sufficient contact to the tool or workpiece to achieve the desired effect as a heat sink.

Furthermore, there exists basically the striving for reducing the coolant amount to be used. In this regard, minimum lubrication is referred to, with a mixture of air and the actual coolant, e.g. oil, being used as the lubricant.

From the above, it is an object of the invention to propose a further developed thread forming tool having a thread part based on a helical effective surface which is optimized in terms of the lubricating and cooling properties to be achieved, and which is particularly suitable for the use in thread forming processes with minimum quantity oil/emulsion lubrication.

The solution of the inventive object is performed by a thread forming tool according to the feature combination of claim 1 with the dependent claims including at least appropriate designs and improvements.

It is to be noted at this point that the following explanation of the specific realization of the cooling channels may not only be applied in thread forming tools on the basis of non-cutting treatment, but also in traditional thread-cutting tools with a chipping machining, consequently in common thread cutters or thread taps.

Consequently, a thread forming tool having a thread part based on a helical effective surface and an adjoining clamping shank is taken as a basis, wherein the helical effective surface is formed by pressing lobes. The thread part extends from a so-called chamfer or taper in the direction of the clamping shank across a length range defined depending on the case of application. Furthermore, at least one axially oriented, groove-like cooling channel that runs between the pressing lobes and extends from the chamfer or taper to the clamping shank is provided for receiving and guiding coolant.

Following the basic inventive idea, the cross-sectional area, in particular the width of the at least one cooling channel increases from the chamfer toward the clamping shank.

Hence, a virtual widening of the cooling channel from the tool tip toward the end of the thread part takes place.

Such a configuration of the cooling channel surprisingly turned out to result in an optimized guidance of the coolant at a maximum lubricating/cooling effect, so that the coolant amount to be used, in particular the amount of liquid coolant may be reduced.

In a preferred configuration of the invention, the enlargement of the cross-sectional area, in particular the increase in width is continuous, and the end of the at least one cooling channel pointing to the clamping shank passes into a conically fanned-out area.

In a further configuration of the invention, the cooling channel depth may be realized to be decreasing and not to extend over the entire length of the chamfer in the portion of the conically fanned-out area.

In a variation of the invention, the at least one cooling channel extends in the axial direction beyond the thread part up into a transition area toward the clamping shank. This transition area may be realized to be of a reduced diameter relative to the clamping shank, i.e. correspondingly stepped in its diameter.

For supplying the coolant, it is furthermore proposed for at least one radial bore to be allowed to open into the at least one cooling channel, which radial bore passes into a central through-bore reaching up to the shank end so as to ensure the coolant flow in this regard.

The at least one cooling channel according to the invention in one embodiment of the invention may start at the at least one radial bore, but may even extend in the direction of the radial bore toward the tip of the tool and from the radial bore in the direction of the shank end with view to the explained increase in width, or start at the radial bore and increase in the direction of the shank.

In one realization of the invention, n pressing lobes are formed, with a cooling channel extending in each case between two adjacent pressing lobes.

The number n is in this case in the range between 2 and 10, preferably between 3 and 5.

The at least one coolant radial bore may have a course that deviates from the normal relative to the tool's longitudinal axis, and here in particular may have a helix angle oriented toward the tool tip, i.e. the chamfer or taper.

According to the invention, the use of the presented thread forming tool for a thread forming process by minimum quantity lubrication furthermore is on the basis of an air/lubricant mixture.

The invention will be explained in more detail below by means of an exemplary embodiment and referring to the figures.

Figure 2:
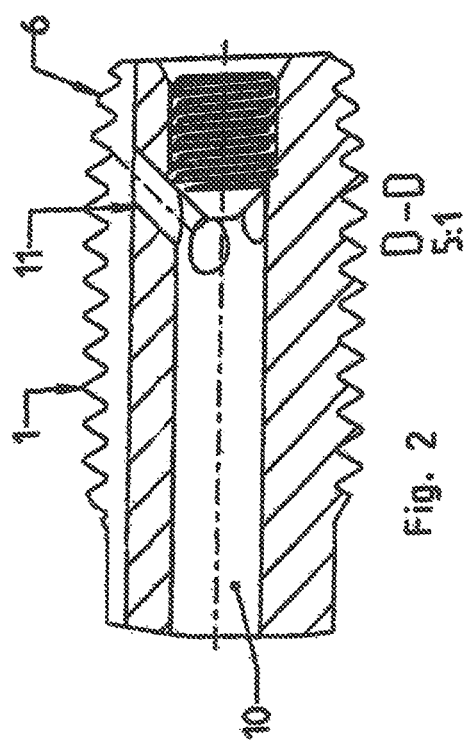
Figure 3:
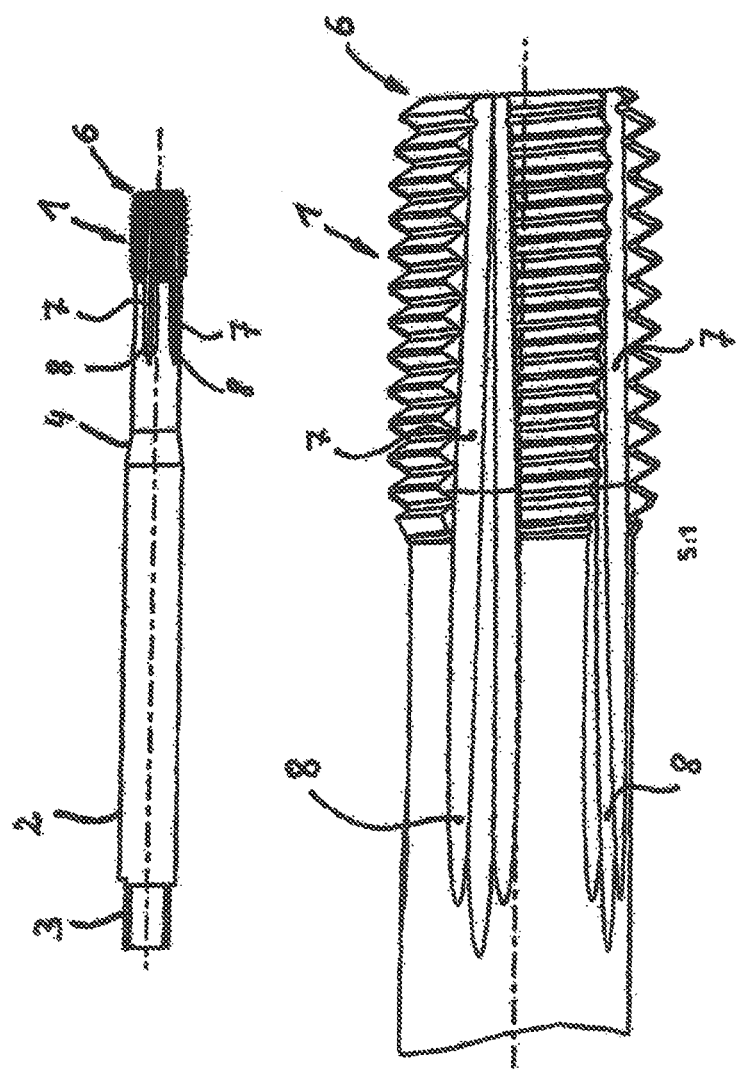

Shown are in:

FIG. 1 a longitudinal view, not to scale, of the thread forming tool according to the invention, having a central coolant bore, as well as a detailed representation of the thread part and the visible increase in the cross-sectional area, in particular the width of an outer surface coolant groove;

FIG. 2 a longitudinal section view of a portion of the thread part of the thread forming tool having an obliquely extending radial bore passing into the central cooling channel, and FIG. 3 a side view of a further embodiment of the thread forming tool having a cooling channel that increases in its cross-sectional area, in particular in its width, along with a detailed representation of the conically fanned-out areas of the cooling channel(s).

In the representation according to FIG. 1 a longitudinal side view of a thread forming tool according to the invention as well as a front side view with a view to the thread part are illustrated in the upper part of the figure.

The thread forming tool accordingly exhibits a helical effective surface 1 and has a clamping shank 2 with a tool holder 3, e.g. in the form of a polygon, in particular a square.

The structure of the thread forming tool is essentially rod-shaped and has, between its tip in area A and its clamping end in area B, a diameter step formation 4 that virtually forms a transition area between the step part and the clamping shank 2.

In the front view according to FIG. 1, i.e. the view of the front side of the thread forming tool, five pressing lobes 5 are visible.

As shown in FIG. 1, thread part 1 extends from a chamfer or taper 6 in the direction of clamping shank 2, namely across a defined length portion.

Cooling channels 7, which are visible as a detailed representation in the lower image part of FIG. 1, are located between the pressing lobes 5.

According to one embodiment, the cooling channels 7 are widened in the direction of clamping shank 2, namely starting from an imaginary continuous straight line, for instance, 1° to 10° to the left and right.

The thread part is profiled in its outer diameter, and the chamfer has the exemplary lead angle illustrated in the Figure.

The surface area increase of the grooves 7 is continuous in the exemplary embodiment according to the Figures and, as shown in FIGS. 1 and 3, passes into an exemplary conically but also shell-like fanned-out area 8.

In the portion of the conically fanned-out area 8, the depth of the cooling channel 7 may be realized to be decreasing.

As can be understood from the representations, the formation of the cooling channels 7 extends in the axial direction beyond the thread part 1 up into the area toward the clamping shank across a defined length of the part of reduced diameter of the thread forming tool (see in each case the upper representations according to FIGS. 1 and 3).

As can be understood from FIG. 2, which illustrates a longitudinal cut through the front portion of thread part 1, a central through-bore 10 is formed in the thread forming tool which is closed at its front end pointing toward taper 6 and passes into at least one radial bore 11. Through the central bore 10 together with the adjoined radial bore 11, coolant can be supplied and guided backward via the corresponding cooling channels 7.

The radial bore 11 has a course deviating from the normal relative to the dash-dotted longitudinal axis of the tool, namely exhibits, as an example, an angle in the range of 30° to <90°, e.g. 45° having an outflow direction toward taper 6.

The number of cooling channels 7 according to the exemplary embodiment is five, and five pressing lobes 5 are formed. The groove width expands, as an example, in a range from about 1 mm to a fan area of about 3 mm.

The surface of the thread forming tool is hardened and, where appropriate, coated at least in the area of the thread part.

The formation of the cooling channels 7 may be performed by grinding in a manner known as such, with alternative fabrication methods being conceivable.

What is claimed is:

1. A thread forming tool comprising:
   a thread part on a helical effective surface;
   an adjoining clamping shank, wherein the helical effective surface is formed by pressing lobes and the thread part extends from a chamfer located at a tip of the thread forming tool in an axial direction of the thread forming tool toward the clamping shank, as well as having at least one axially oriented cooling channel that runs between the pressing lobes and extends from the chamfer toward the clamping shank,
   wherein the at least one cooling channel comprises a groove configured to receive and guide a coolant along the at least one cooling channel; and
   wherein a width of the at least one cooling channel continuously increases between the pressing lobes in the axial direction from the chamfer toward the clamping shank.

2. The thread forming tool of claim 1, wherein an end of the at least one cooling channel pointing to the clamping shank passes into a conically fanned-out area.

3. The thread forming tool of claim 2, wherein the cooling channel has a depth that decreases in the portion of the conically fanned-out area.

4. The thread forming tool of claim 1, wherein the at least one cooling channel extends in the axial direction beyond the thread part up into a transition area toward the clamping shank.

5. The thread forming tool of claim 1, wherein, at least one radial bore opens into the at least one cooling channel, which radial bore passes into a central through-bore reaching up to an end of the clamping shank so as to ensure a coolant flow.

6. The thread forming tool of claim 5, wherein the at least one cooling channel starts at the radial bore.

7. The thread forming tool of claim 5, wherein the at least one radial bore has a course that deviates from a direction perpendicular to the axial direction of the thread forming tool.

8. The thread forming tool of claim 1, wherein the pressing lobes are formed, with the cooling channel extending between two adjacent pressing lobes.

9. The thread forming tool according to claim 8, wherein there are a number of pressing lobes and the number is in the range between 2 and 10.

10. A method of using a thread forming tool according to claim 1 for a thread forming process using a reduced amount of lubrication.

\* \* \* \* \*